US006967613B2

(12) United States Patent
Holmberg et al.

(10) Patent No.: US 6,967,613 B2
(45) Date of Patent: Nov. 22, 2005

(54) BROADBAND WAVEFORM RECONSTRUCTION FOR RADAR

(75) Inventors: Bart A. Holmberg, Bellevue, WA (US); Paul E. Christianson, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 30 days.

(21) Appl. No.: 10/802,980

(22) Filed: Mar. 17, 2004

(65) Prior Publication Data

US 2005/0206557 A1 Sep. 22, 2005

(51) Int. Cl.[7] ............................................. G01S 13/89
(52) U.S. Cl. ................ 342/25 A; 342/25 D; 342/25 F; 342/101; 342/191; 342/195
(58) Field of Search .................. 342/25 R, 25 A–25 F, 342/90, 101, 111, 115, 116, 191, 194, 195, 342/196

(56) References Cited

U.S. PATENT DOCUMENTS

| | | | | |
|---|---|---|---|---|
| 5,343,204 A | * | 8/1994 | Farmer et al. | 342/25 R |
| 5,831,570 A | * | 11/1998 | Ammar et al. | 342/26 R |
| 6,018,306 A | * | 1/2000 | Serbin | 342/25 R |
| 6,434,261 B1 | * | 8/2002 | Zhang et al. | 382/132 |
| 6,501,258 B1 | * | 12/2002 | Levitt et al. | 324/76.37 |
| 6,643,406 B1 | * | 11/2003 | Hajjahmad et al. | 382/240 |
| 6,792,057 B2 | * | 9/2004 | Kabel et al. | 375/346 |
| 2002/0159627 A1 | * | 10/2002 | Schneiderman et al. | 382/154 |
| 2004/0071363 A1 | * | 4/2004 | Kouri et al. | 382/276 |
| 2004/0174770 A1 | * | 9/2004 | Rees | 367/7 |
| 2005/0027770 A1 | * | 2/2005 | Papadakis et al. | 708/400 |

OTHER PUBLICATIONS

"Ultrawide-band coherent processing", Cuomo, K.M.; Pion, J.E.; Mayhan, J.T.; Antennas and Propagation, IEEE Transactions on, vol.: 47 , Issue: 6, Jun. 1999 Ps: 1094-1107.*

"High resolution synthetic aperture radar using a multiple sub-band technique", Cooper, P.S.; Wons, A.F.; Gaskell, A.P.;Radar 97 (Conf. Publ. No. 449), Oct. 14-16, 1997 Ps:263-267.*

"A subband algorithm for real-time autofocusing of SAR images", Bierens, L.; IGARSS '94. 'Surface and Atmospheric Remote Sensing: Technologies, Data Analysis and Interpretation', vol.: 2, Aug. 8-12, 1994 Ps:915-917.*

* cited by examiner

Primary Examiner—John B. Sotomayor
(74) Attorney, Agent, or Firm—Black Lowe & Graham PLLC (57) ABSTRACT

Resolution of a radar operating within a bandwidth is improved by defining a quantity of substantially rectangular sub-band filters to subdivide the bandwidth in the frequency domain into the quantity of sequential sub-bands having a sub-bandwidth. Each signal sent by the radar is associated with a transmission temporal moment. Each of the quantity of return signals received is routed in one to one correspondence to the sub-band filters, each signal being received at a corresponding sub-band filter. The return signals received are summed by synchronizing the associated transmission temporal moment to produce a reconstructed return signal.

6 Claims, 7 Drawing Sheets

$$h(t) = sinc(N\Delta ft) * [\cos Nb(\Delta ft) \cdot sinc(\alpha \Delta ft)]$$

FIG.3

FOR α < 1

BROADBAND WAVEFORM RECONSTRUCTION FOR RADAR

FIELD OF THE INVENTION

This invention relates generally to radar technology and, more specifically, to radar return signal analysis.

BACKGROUND OF THE INVENTION

In a number of radar applications, features of interest in radar returns remain static for more than a single transmit and receive cycle. One such application is airborne ground mapping radar. One important metric in such applications is range resolution. Range resolution and cross-range resolution together determine the smallest sized ground objects or features that can be resolved by the radar. Range resolution in radar is proportional to signal (pulse) bandwidth, i.e. greater bandwidth allows better resolution. Generally, however, increasing pulse bandwidth requires greater equipment expense to effect the generation, transmission, reception, and resolution of increased pulse bandwidths.

Most conventional radar systems operate in a relative narrow frequency band; they use harmonic (sinusoidal) signals as carrier oscillations to transmit the information. The reason for that is rather simple; a sinusoid is an eigenoscillation of LC-contour, which is the simplest and, so, the most widely-used electrical oscillation system. The resonance features of such a system make possible frequency selection of the large number of information channels operating in the common environment (space, guiding, and optical communication lines).

However, it is a frequency band that determines the information content of radar systems, as the volume of information transmitted per time unit is directly proportional to a frequency band. To raise the information capability of a radar system, the widening of its frequency band is needed. The only alternative approach is an increase in information transmission time.

One inherent expense in widening a bandwidth for a radar application is that antennae for the system must be designed to achieve an optimal waveform for a particular bandwidth, i.e. to control the selection of range resolution over side lobe-levels, to determine Doppler tolerance and resolution, etc. The narrower the bandwidth, the more easily an antenna design can be optimized.

What is needed in the art is a method of resolving radar returns of a pulse radar system to increase the range resolution without increasing the pulse bandwidth and thus the cost of producing the radar.

SUMMARY OF THE INVENTION

A method for reconstructing a large bandwidth signal from smaller bandwidth pulses over several transmit and receive cycles. Range resolution is greatly improved while keeping the bandwidth and attendant cost low.

Resolution of radar operating within a bandwidth is improved by defining a quantity of substantially rectangular sub band filters to subdivide the bandwidth in the frequency domain into the quantity of sequential sub-bands having a sub bandwidth. The same quantity of return signals are received. Each signal is associated with a transmission temporal moment. The quantity of return signals received is routed in one to one correspondence to the sub-band filters, each signal being received at a corresponding sub-band filter. The return signals received are summed by synchronizing the associated transmission temporal moment to produce a reconstructed return signal.

As will be readily appreciated from the foregoing summary, the invention provides improved resolution for several radars including pulse radar.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, resolution of a radar operating within a bandwidth is improved by defining a quantity of substantially rectangular sub-band filters to subdivide the bandwidth in the frequency domain into the quantity of sequential sub-bands having a sub-bandwidth. Each signal sent by the radar is associated with a transmission temporal moment. Each of the quantity of return signals received is routed in one to one correspondence to the sub-band filters, each signal being received at a corresponding sub-band filter. The return signals received are summed by synchronizing the associated transmission temporal moment to produce a reconstructed return signal.

Figure 1:
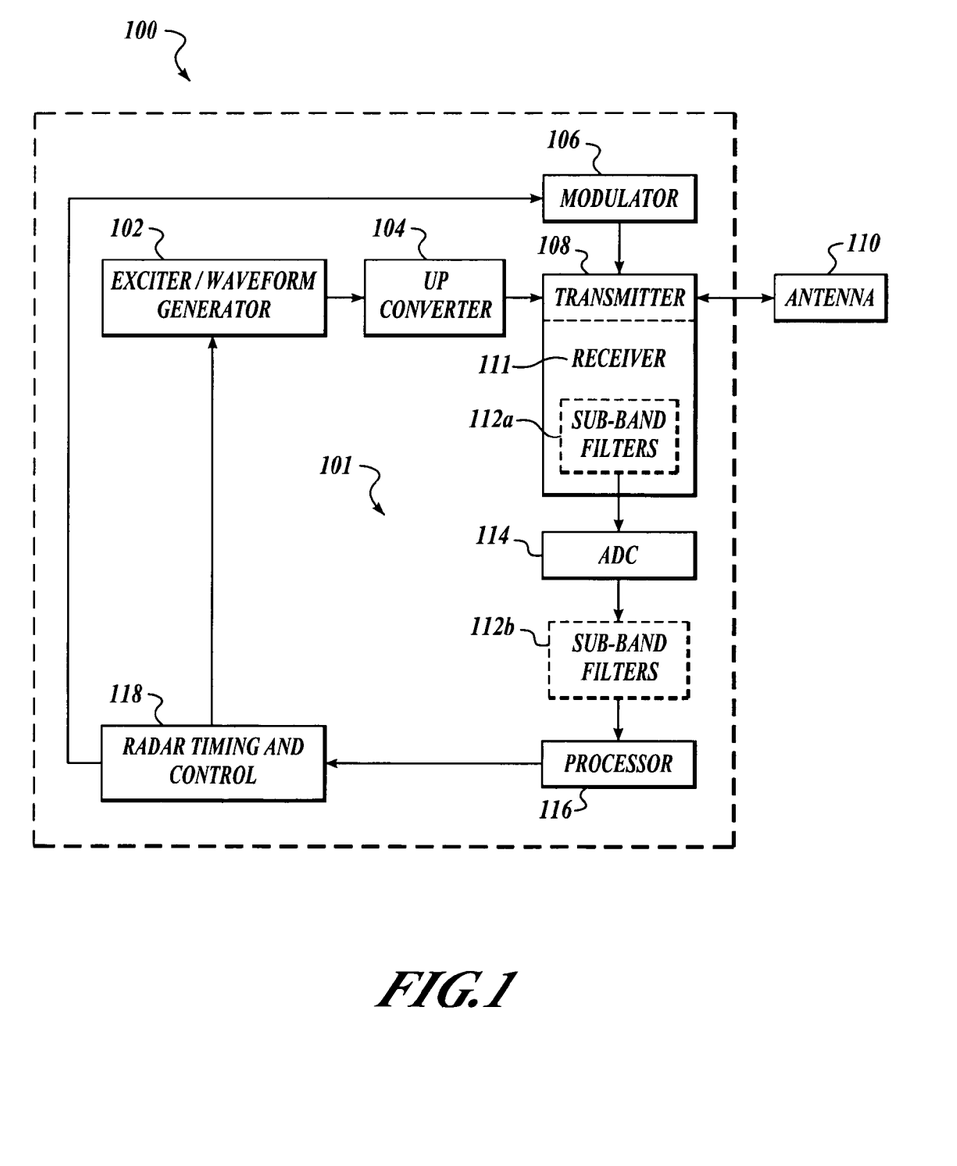
FIG. 1 is a block diagram of a generalized radar.

FIG. 1 is a generalized block diagram of a radar system 100 implemented in accordance with the teachings of the present invention. Those skilled in the art will appreciate that although the present teachings are disclosed with reference to an illustrative radar system implementation, the invention is not limited thereto. The present teachings may be applied to a variety of image processing applications without departing from the scope thereof. The system 100 includes a receiver/exciter 101 of conventional design and construction. As is known in the art, the receiver/exciter 101 includes an exciter/waveform generator 102 that generates a waveform. The radar signal is upconverted by an upconvert stage 104 and filtered, amplified and transmitted by a transmitter stage 108 in response to a reference signal from a modulator 106. The transmit signal is radiated by a radar antenna 110 as a beam of electromagnetic energy.

In an illustrative real beam ground mapping application, scatter returns of the transmit beam as it is reflected from the ground or other surface are received by the antenna 110 and applied to a radar receiver stage 111. The receiver 111 amplifies, filters and downconverts the scatter return in a conventional manner. A series of contiguous sub-band filters 112a are included in the receiver to selectively allow signals of a designated sub-band to pass. The convolved, amplified, filtered and downconverted scatter returns are digitized by an analog-to-digital converter stage 114 and fed to a processor 116 in a processor stage 115. Where the sub-band filters are not placed in the receiver stage 111, they may alternately be enabled in a digital embodiment and digitally filter the signal allowing the corresponding digital sub-band to pass to the processor 116.

The processor 116 drives a radar timing and control stage 118. The radar timing and control stage 118 sends signals to both the exciter/waveform generator 102 and the modulator to time initiation of a next signal.

Figure 2:
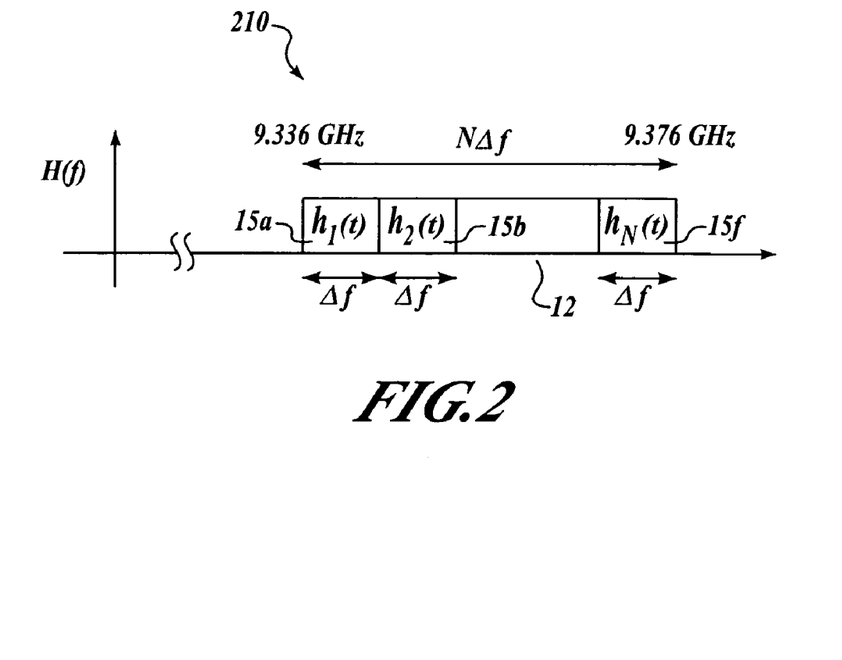
FIG. 2 is a graphic representation of a series of transmitted sub-band pulses used to constitute an outgoing pulse; and, FIG. 3 is a graphic representation of a transformed return expressed as a convolution of two knowable signals.

FIG. 2 is a plot in the frequency domain of the return function 210 of a radar system. Rather than to receive the returned echo signals as a single bandwidth pulse, the receiver is configured as a contiguous series of N rectangular sub-band filters 215a, 215b, 215f where N is a selected integer. In aggregate, the filters are tuned to provide continuous coverage across a band 212 breaking the band 212 into N sub-bands 215a, 215b, 215f of $\Delta f$ width in the frequency domain. Together, then, the entire bandwidth can be expressed as $N\Delta f$. The signal echo returns are expressed as function in frequency $H(f)$ such that:

$$H(f)^F = \sum_{i=1}^{N} h_i(t) \tag{1}$$

To save in the technology investment necessary to effect the equation as true, an assumption is made. With each pulse, only one of the $h_i(t)$ is receivable. However, if the target is suitably static over the duration of N pulses, the equation will hold as true as if each pulse were simultaneously received allowing the pulses to be processed as though they were received in parallel rather than in series.

As stated above, the sub-band 215a, 215b, 215f filters are rectangular functions in the frequency domain and exactly adjacent to each other resulting in full coverage across the radar band 212. Thus, $$H(f) = rect\left(\frac{f-f_0}{N\Delta f}\right) \cdot \left[comb\left(\frac{f}{\Delta f}\right) * rect\left(\frac{f}{\alpha\Delta f}\right)\right] \tag{2}$$

where * represents a linear convolution; $\Delta f$ is the sub-band channel width; $\alpha$ is a coefficient between 0 and 1 that represents the nearness of rectangularity in the sub-filters and $$comb(f) = \sum_{k=-\infty}^{\omega} \delta(f-k) \tag{3}$$

For purposes of the transform into the time domain, the sine transform pair identities are used:

$$rect\left(\frac{f-f_0}{N\Delta f}\right)^F = sinc(\Delta ft)e^{-j2\pi f_0 t} \tag{4}$$

$$comb\left(\frac{f}{\Delta f}\right)^F = comb(\Delta ft) \tag{5}$$

It is necessary then, to find the reverse Fourier transform of the return in order to determine a function in time rather than one in frequency. To aid the inverse transform, the expected result may be expressed as:

$$h(t)=sin\ c(N\Delta ft)*[comb(\Delta ft)\cdot sin\ c(\alpha\Delta ft)] \tag{6}$$

Figure 3:
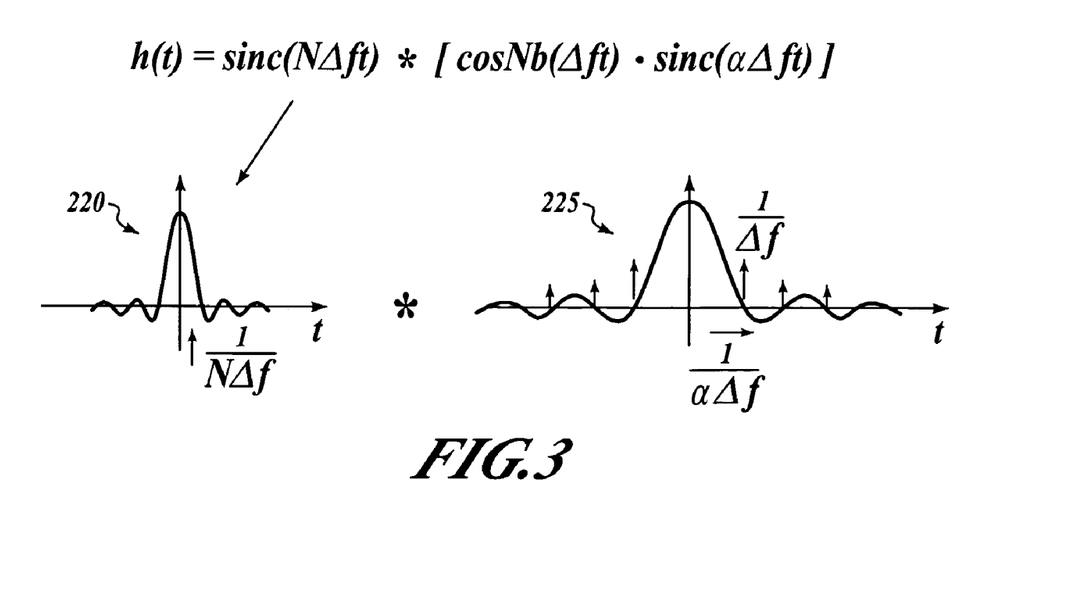

The convolution of a sinc($N\Delta ft$) curve 220 with a [comb($\Delta ft$)·sin c($\alpha\Delta ft$)] curve 225 is represented graphically in FIG. 3. The regular function sinc($N\Delta ft$) 220 in one presently preferred embodiment is stored as a permanent and regular function in a look up table for convolution. Similarly sinc ($\alpha\Delta ft$) may be likewise stored for each setting of $\Delta f$. Thus, the comb($\Delta ft$) function defines any vagaries in the resulting curve.

Thus, for $\alpha \to 1$, i.e. the sub-band filters are perfectly rectangular, the function simplifies to:

$$h(t)=sin\ c(N\Delta ft) \tag{7}$$

Figure 4:
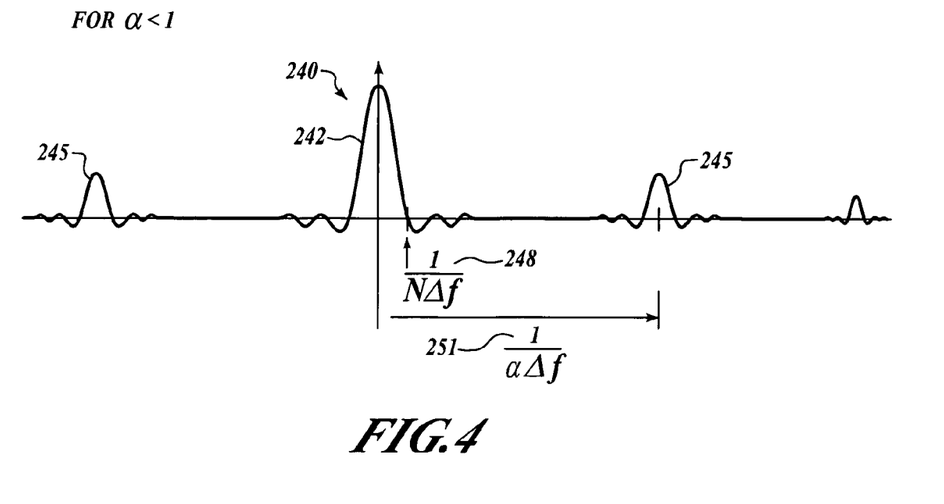
FIG. 4 is a plot of a waveform resulting from the convolution of two signals.

FIG. 4 is representative of a resulting response function 40. Note that the side lobe artifacts 245 reduce to zero as $\alpha \to 1$. For each of the N functions $h_i(t)$ a similar appearing resulting function includes a principle centered peak 242 and artifact sidelobes 245. Interestingly, the relationship between a quality of the results and the number N of the sub-bands (along with the inversely proportional $\Delta f$) becomes evident. As the number N of the sub-bands goes up, the side lobe artifacts are pushed out further and further a distance 251. While the width 248 of the principal lobe 242, remains constant for any N and any $\Delta f$, the distance 251 from the principal centered peak 42 from the remaining side lobe artifacts 45.

Figure 5:
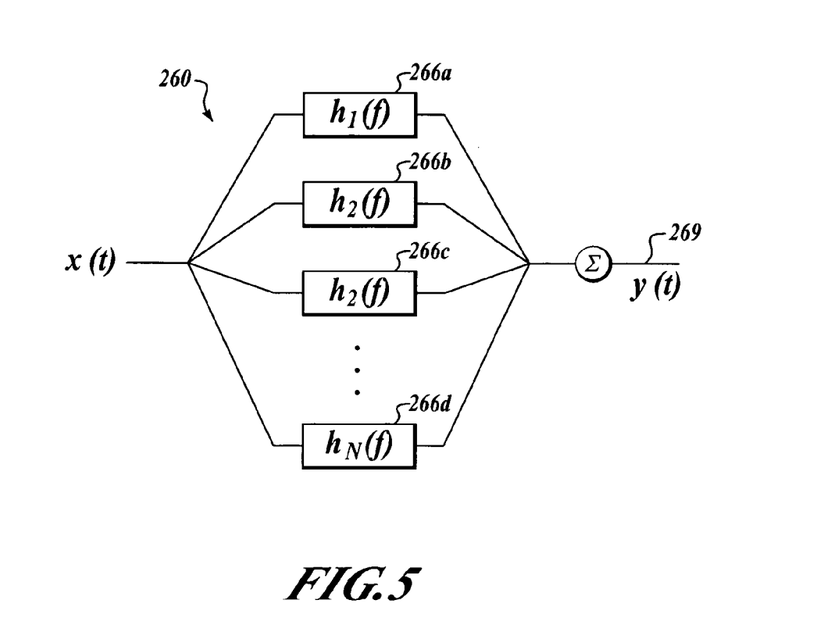
FIG. 5 is a signal data chart graphically representing the summing of several return signals.

FIG. 5 shows the summing 260 of the several $h_i(t)$ functions 266a, 266b, 266e to determine a summed function y(t) 269. The strong nature of the several principal lobes 240 (FIG. 3) sums to give an average signal across the several $h_i(t)$ functions 266a, 266b, 266e. As a result of the summing, the resulting principal lobe is determines a distance to target with far greater precision than any of the single $h_i(t)$ functions.

Figure 6:
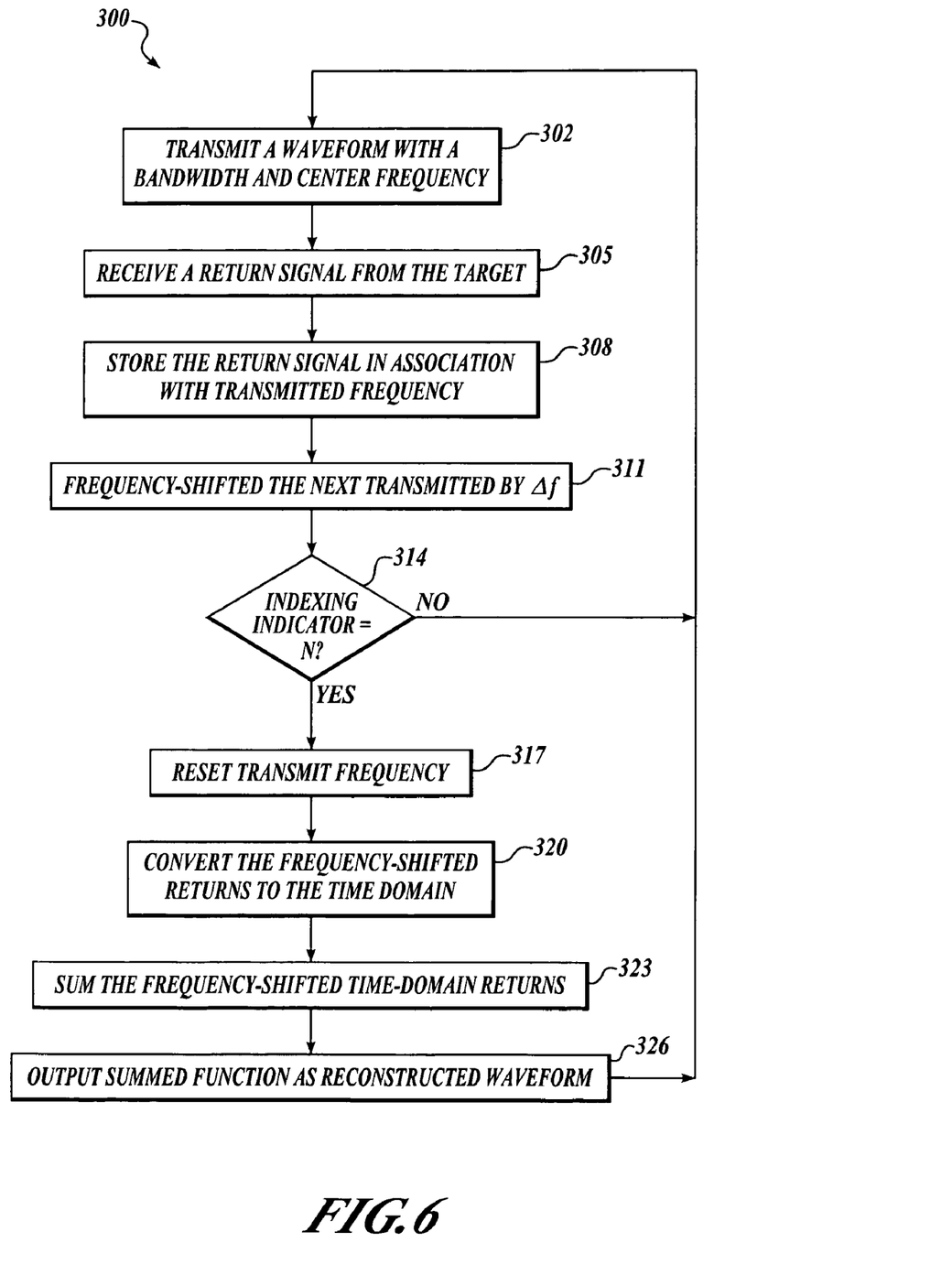
FIG. 6 is a flow chart for an exemplary method formed in accordance with the present invention.
Figure 7:
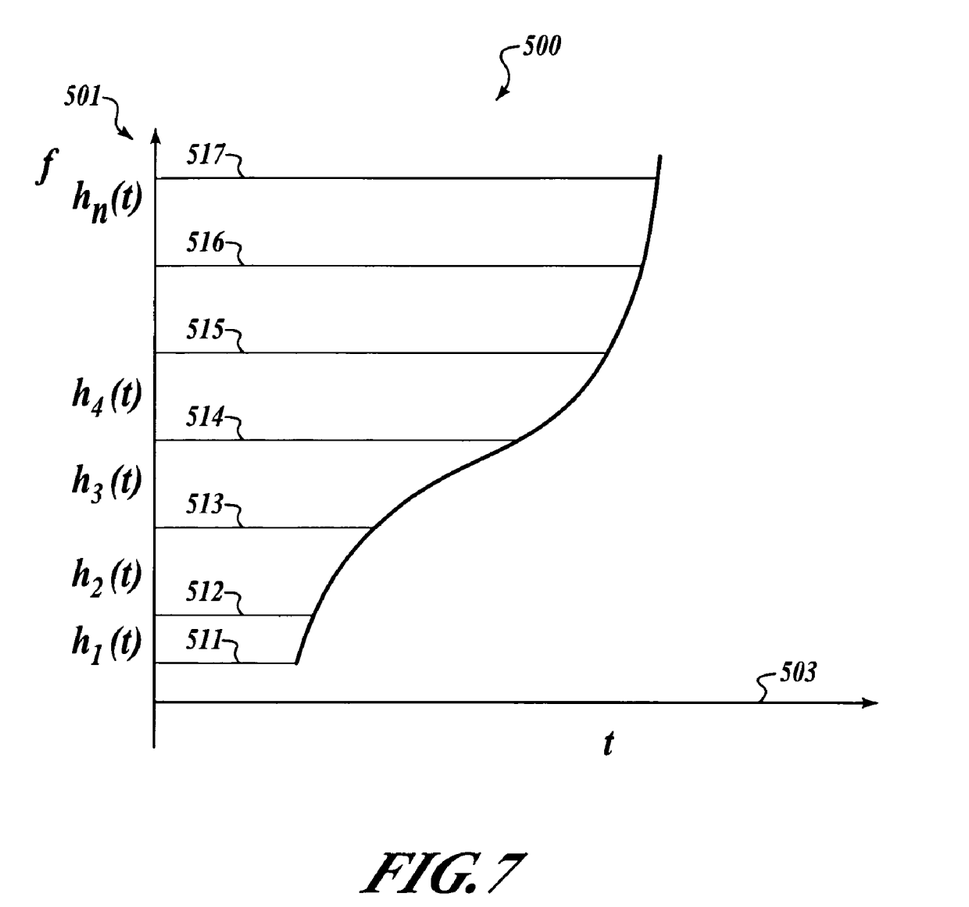
FIG. 7 is a plot of pulse length in time as a function of frequency changes.

A method 300, then, for generating and reconstructing the returns is set forth in the flowchart in FIG. 6. As indicated, a number N of rectangular adjacent sub-bands with a width of $\Delta f$ are presumed. Additionally, the regularity of the pulses is frequent enough that the movement of targets over the period of N pulses is insignificant. In a presently preferred embodiment, a pulse is transmitted in the first sub-band at a block 302.

At a block 305, a return is received from the target. At a block 308, the target return is stored in association with the identity of the pulse and the series of N pulses. In a presently preferred embodiment, that identity is the frequency of the pulse, though any unique identifier might be used such as an indexing indicator. To ready the system for the next pulse, the transmission frequency is incremented to the next sub-band, at a block 311. While the presently preferred embodiment uses a transmitted pulse filling the defined sub-band, pass-band filters on the receiver can present the same results so long as the sub-band being passed relates to the band as one of a series of adjacent sub-band rectangular filters of width $\Delta f$. At a block 314, when the N pulses in the series have been completed, the series is ready for analysis. At a block 317, the transmit frequency is reset to the first sub-band to commence the next series.

At a block 320, each return is converted to the time domain. Making the transform from frequency to time domain is inherent in the use of radar. Novelty, here, includes frequency shifting the transmitted pulses within the band, and analyzing each of the returns in each of the sub-bands as a constituent of an aggregate return.

At a block 323, the individual pulses or time domain returns are summed to generate a reconstructed waveform. By virtue of the addition of the several time domain returns, the reconstructed return is essentially an averaged return of the returns at each of the several sub-band frequencies and output as a reconstructed waveform at a block 326. The imprecision inherent with a return at each of the sub-band frequencies, is diluted across the several sub-band frequencies.

For purposes of examining operation of the reconstructed waveform, the following conditions, arbitrarily selected will demonstrate the method in a pulsed radar (i.e., the method of reconstructing the waveform is not dependent upon the conditions):

i) x(f) or 24 MHz WLFM waveform, b(t)
ii) $\Delta f \approx 3$ MHz
iii) N=8

Thus, according to the conditions set forth above, FIG. 6 is a plot of a series of pulses $h_i(t)$ shown on the y-axis 501 against the duration of each pulse along the x-axis 503. The system generates a sequence of the eight transmitted pulses $h_i(t)$ shown here as $h_0(t)$ 510, $h_1(t)$ 511, $h_2(t)$ 512, $h_3(t)$ 513, $h_4(t)$ 514, $h_5(t)$ 515, $h_6(t)$ 516, $h_7(t)$ 517. As shown here, the pulses will vary in temporal duration according to the frequency of the pulse.

For each transmitted pulse, a corresponding pulse $r_i(t)$ is received. Each $r_i(t)$ is expressed as a convolved product of the corresponding $h_i(t)$ function thus:

$$r_i(t)=h_i(t)*x(t) \quad (8)$$

Each of the $r_i(t)$ functions is then interpolated eight times, collected at a frequency of 4 MHz complex. The interpolated results are appropriately frequency-shifted according to the $\Delta f \geq 3$ MHz condition:

$$z_i(t)=r_i(t)e^{j\omega_i 2\pi t} \text{ where } \omega_i=i\Delta f \quad (9)$$

Figure 8:
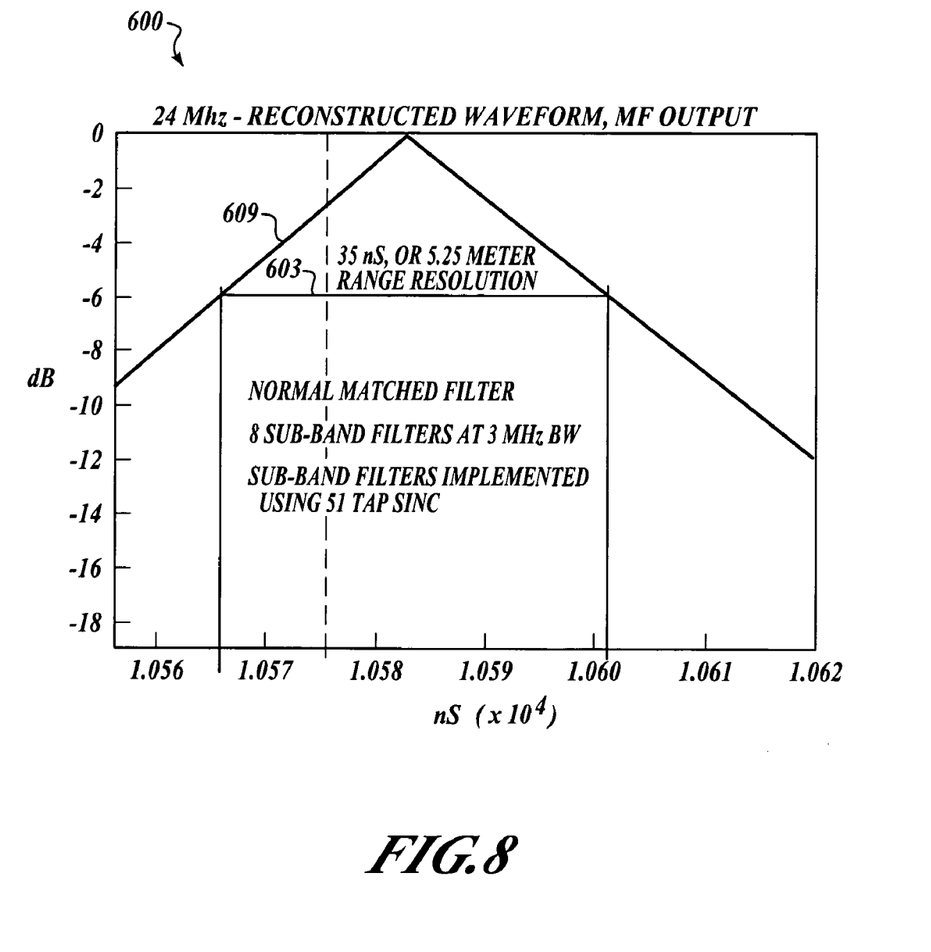
FIG. 8 is an idealized reconstructed waveform output showing a reconstructed waveform.

These frequency shifted functions $z_i$ are then summed to create a reconstructed waveform. FIG. 8 graphically shows the relationship of the sum 603 of idealized pulses $h_i(t)$ to the idealized reconstructed waveform. Because the principal peak 45 will tend statistically to temporally occur at a middle point of the sum of the pulses, the idealized response 609 will peak at a range and fall off symmetrically on each side of the peak.

Figure 9:
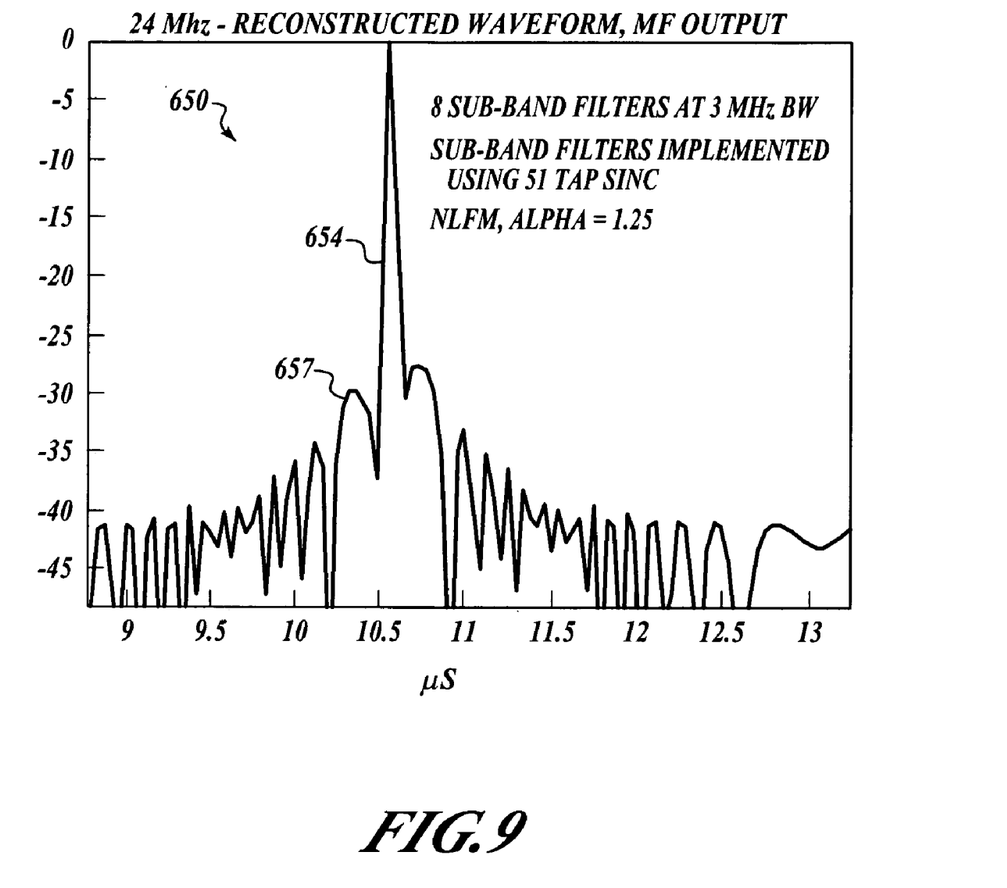
FIG. 9 is a simulated reconstructed waveform output showing the reconstructed waveform.

In practice, the filters need not be perfectly rectangular, i.e. $\alpha \rightarrow 1$, as the side-lobe artifacts tend to cancel upon summing. FIG. 9 is a simulated sum 650 of returns from a target showing the principal peak 654 along with secondary peaks 657 falling away as predicted in the idealized sum 603 (FIG. 8).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for improving resolution of a radar operating within a bandwidth, the method comprising:
   defining a quantity of substantially rectangular sub-band filters to subdivide the bandwidth in the frequency domain into the quantity of sequential sub-bands having a sub-bandwidth;
   receiving the quantity of return signals, each signal associated with a transmission temporal moment;
   routing the quantity of return signals received in one-to-one correspondence to the sub-band filters, each signal being received at a corresponding sub-band filter; and
   summing the quantity of return signals received, synchronizing the associated transmission temporal moment to produce a reconstructed return signal.

2. The method of claim 1, wherein the return signals are return signals in a pulse radar.

3. A radar receiver capable of receiving a bandwidth, the receiver comprising:
   a quantity of substantially rectangular sub-band filters to subdivide the bandwidth in the frequency domain into the quantity of sequential sub-bands having a sub-bandwidth;
   a router for receiving the quantity of radar return signals and outputting the signals in a one-to-one corresponding relationship to the sub-band filters; and
   a stage for summing the quantity of radar return signals from the sub-band filters to create a reconstructed signal.

4. The radar receiver of claim 3, wherein the receiver is a pulse radar receiver.

5. A processor for radar returns, the processor comprising:
   a quantity of substantially rectangular sub-band filters to subdivide a bandwidth in the frequency domain into the quantity of sequential sub-bands having a sub-bandwidth;
   a first component for receiving the quantity of return signals, each signal associated with a transmission temporal moment;
   a second component configured to route the received return signals in one-to-one correspondence to the sub-band filters, each signal being received at a corresponding sub-band filter; and
   a third component configured to sum the return signals synchronizing the return signals according to the associated transmission temporal moment to produce a reconstructed return signal.

6. A radar system having a bandwidth, the radar system comprising:
   a quantity of substantially rectangular sub-band oscillators to subdivide the bandwidth in the frequency domain into the quantity of sequential sub-bands having a sub-bandwidth;
   a router configured to route the output of each sub-band oscillator in one-to-one correspondence to the quantity of pulses for transmission;
   a transmitter to transmit the quantity of pulses at a target;
   a receiver to receive the quantity of pulses reflected from the target, each pulse associated with a transmission temporal moment; and
   a summing node for summing the received return signals synchronizing the received return signals according to the associated transmission temporal moment to produce a reconstructed return signal.

* * * * *